Antone Potocnik,
INVENTOR

Sept. 2, 1969     A. POTOCNIK     3,464,633
MULTIPLE FLUID CONTROLLING SHEAR VALVE Filed Nov. 16, 1967     2 Sheets-Sheet 2

Antone Potocnik,
INVENTOR.

BY.

ATTORNEY.

United States Patent Office 3,464,633
Patented Sept. 2, 1969

3,464,633
MULTIPLE FLUID CONTROLLING SHEAR VALVE
Antone Potocnik, Redondo Beach, Calif., assignor to TRW Inc., Redondo Beach, Calif., a corporation of Ohio
Filed Nov. 16, 1967, Ser. No. 683,711
Int. Cl. B05b 7/00; F16k 17/14, 17/40
U.S. Cl. 239—425
13 Claims

ABSTRACT OF THE DISCLOSURE

A shear valve having a body member, an obturator member, and operating means for exerting opposing forces on the members in a direction to effect relative movement thereof between valve closed and valve open positions, the members defining one or more fluid passages and leakage paths closed by primary and secondary shear seals, respectively, which are sheared simultaneously upon actuation of the valve operating means to open the valve, thereby to permit fluid flow through each valve passage.

BACKGROUND OF THE INVENTION

Field of the invention

This invention relates generally to fluid flow control valves. More particularly, the invention relates to improvements in shear valves.

Prior art

Shear valves are well-known in the art. Typical existing valves of this type, for example, are disclosed in the following prior art patents: Numbers 2,947,315; 2,997,051; 3,027,903; 3,111,133; and 3,141,470. Generally speaking, the existing shear valves are characterized by a body member containing a fluid passage and an obturator member in the passage which is joined to the body member by a shear seal. This shear seal positively blocks fluid flow through the passage. The valves are equipped with operating means for exerting opposing forces on the valve members to shear the seal and effect relative movement of the members to valve open position, thereby to permit fluid flow through the valve passage. Such valves possess the unique advantage prior to opening of positive fluid retention for an indefinite period without seal deterioration.

Summary of the invention

The present invention provides a shear valve having three features of improvements. One feature of the valve, for example, resides in its multiple fluid controlling capability. In this regard, it will be recognized that the prior art shear valves disclosed in the above-listed patents are designed to control a single fluid. In many shear valve applications, one the other hand, it is desirable or necessary to control two fluids with a single valve structure. One such application involves controlling the flow of two separate propellants to a bipropellant rocket engine. In this application, it is necessary to positively retain the two propellants for an indefinite time prior to firing of the engine in order to maintain the engine in a constant state of readiness for firing and thereafter to deliver the propellants to the engines simultaneously at the time of firing. The present invention provides such a multiple fluid controlling shear valve having a body member and an obturator member which define two separate fluid passages and are joined by separate shear seals for blocking flow through the passages. These seals are sheared simultaneously in response to actuation of the valve operating means to move the valve members relative to one another from valve closed to valve open positions, thus to permit simultaneous flow of the two retained fluids through their respective valve passages. Thus, the present shear valve is ideally suited for use as an injector for a bipropellant rocket engine. For this reason, the valve will be disclosed in connection with this particular application. However, it will become evident as the description proceeds that the present shear valve is not limited in usefulness to the described rocket engine application and may be employed to control any two fluids.

A second improvement feature of the invention is concerned with the location of the valve operating means relative to the shear seal or seals of the present valve. In this regard, it will be observed that in each of the shear valves disclosed in the earlier listed patents, the valve operating means are located at the downstream side of the shear seal. This downstream location of the operating means provides the shear seal with a dual function prior to opening of the valve. Thus, the shear seal effects positive retention of the fluid being controlled and, in addition, isolates the valve operating means from the retained fluid. Accordingly, there is no problem of fluid leakage to the operating means or deterioration of seals or other parts of the operating means, even though the valve remains closed for a long period of time. In some applications, however, it is impractical or impossible to locate the valve operating means downstream of the shear seal. In this event, obviously, it is necessary to locate the operating means upstream of the shear seal, with the result that fluid leakage to or through the operating means presents a problem when the valve is closed. Also the retained fluid may cause seals and/or other parts of the operating means to deteriorate, particularly if the valve remains closed for a long period of time. One particular application in which such upstream location of the valve operating means is necessary, for example, is the rocket engine application referred to earlier. This invention provides a shear valve in which the valve operating means are located upstream of the shear seal or shear seals of the valve. Accordingly, the valve is uniquely adapted for use in those applications in which such upstream location of the operating means is desirable or mandatory, such as the disclosed bipropellant rocket engine injector. According to this aspect of the invention, the valve is equipped with a secondary shear seal or secondary shear seals for blocking fluid leakage to and thereby isolating the operating means from the retained fluid when the valve is closed, whereby the problems just mentioned are avoided. The primary and secondary shear seals are sheared simultaneously when the valve is opened. After opening, fluid leakage to the operating means is blocked by conventional seal means embodied in the valve which will be in effective sealing condition owing to their isolation from the retained fluid in the closed position of the valve. At this point, attention is directed to the fact that while the above discussed upstream valve operating means and secondary shear seal feature of the invention is particularly useful in a multiple fluid shear valve according to the invention, this feature conceivably may be employed to advantage is a single fluid shear valve.

A third feature of the invention is concerned with certain unique diffuser arrangements for the present multiple fluid shear valves, particularly the disclosed bipropellant rocket engine injector. Three possible diffuser arrangements are disclosed by way of illustration. These three diffuser arrangements are uniquely constructed to alter, respectively, the flow path of either of the two controlled fluids and the flow paths of both fluids.

DESCRIPTION OF THE PREFERRED EMBODIMENTS

Figure 1:
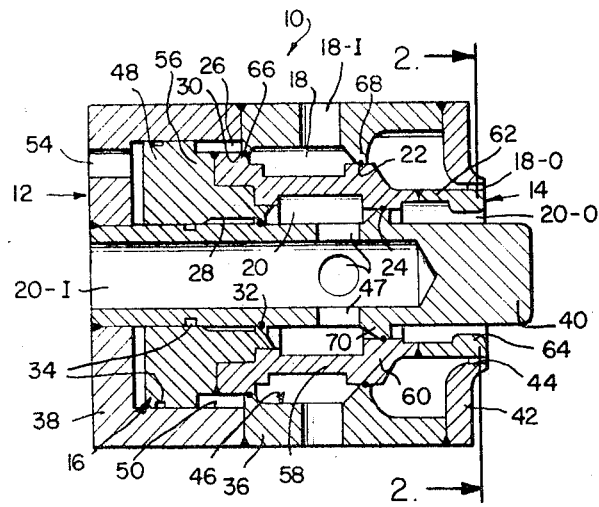
FIG. 1 is a longitudinal section through a shear valve according to the invention for controlling two separate fluids, the valve being illustrated in its closed position.
Figure 2:
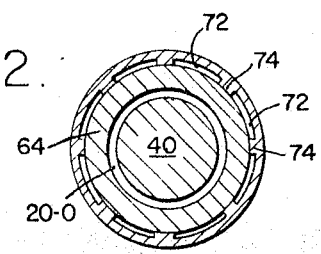
FIG. 2 is a section taken on line 2—2 in FIG. 1.
Figure 3:
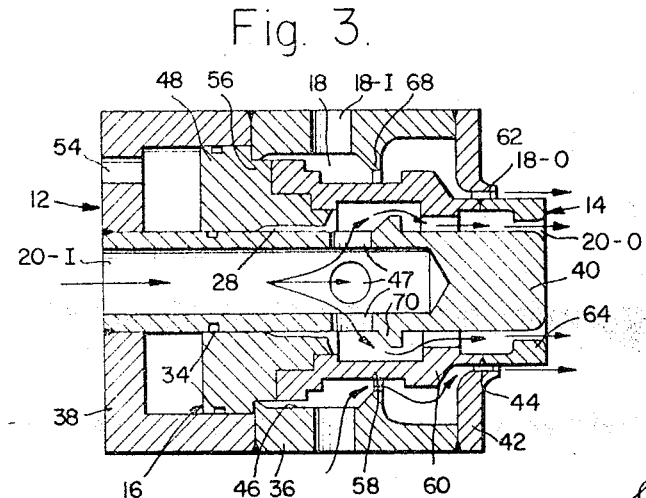
FIG. 3 is a longitudinal section through the valve illustrating the latter in its open position.

In general terms, the invention provides a shear valve, represented in FIGS. 1 through 3 by the shear valve 10, having a body member 12 containing an obturator member 14. Also included in the valve are operating means 16 for effecting relative movement of the valve members between their valve closed positions of FIG. 1 and their valve open positions of FIG. 3. According to one feature of the invention, the valve members 12, 14 define two separate fluid passages 18, 20 for conducting two separate fluids through the valve. Passage 18 has an inlet 18–I and an outlet 18–O. Similarly, passage 20 has an inlet 20–I and an outlet 20–O.

When the valve 10 is in its closed condition of FIG. 1, the valve members 12, 14 are joined by primary shear seals 22, 24. Shear seal 22 extends across the fluid passage 18, transverse to the direction of relative movement of the valve members, between the valve inlet 18–I and the valve outlet 18–O. Shear seal 24 extends across the fluid passage 20, transverse to the direction of relative movement of the valve members, between the valve inlet 20–I and the valve outlet 20–O. These shear seals, which may be formed in various ways, actually provide integral joints between the valve members and serve to positively retain the fluids upstream of the seals. The valve operating means 16, when actuated, exerts opposing forces on the valve members 12, 14 which initially shears the seals 22, 24 and thereafter moves the members relative to one another to their valve open positions of FIG. 3. In these open positions, the fluid passages 18, 20 are opened to permit fluid flow from the valve inlets 18–I and 20–I to the valve outlets 18–O and 20–O. It is evident at this point, therefore, that according to one of its aspects, the invention provides a shear valve for controlling and positively retaining two separate fluids.

According to another of its aspects, the invention provides a shear valve in which the valve operating means 16 is located upstream of the shear seals 22, 24. As noted earlier, this upstream location of the valve operating means presents a problem of fluid leakage to and deterioration of the seals in the operating means when the valve is closed. Thus, fluid leakage paths 26, 28 then exist between the main valve passages 18, 20 and the operating means 16 and in some cases, such as a latter described inventive embodiment, through the operating means to the exterior of the valve. To prevent fluid leakage through the leakage paths 26, 28, the invention provides secondary shear seals 30, 32 which extend across the leakage paths transverse to the direction of relative movement of the valve members 12, 14 between their respective main valve passages and the operating means. When the valve is closed, the secondary shear seals block fluid leakage from the main valve passages to the valve operating means, whereby the latter means and particularly its fluid seals, are isolated from and shielded against deterioration by the retained fluids. The primary and secondary shear seals are sheared simultaneously when the valve is opened by actuation of the operating means to permit fluid flow through the passages. After opening, leakage from the main valve passages 18, 20 through the leakage paths is prevented by conventional sealing means 34 embodied in the operating means.

A further aspect of the invention is concerned with diffuser means (FIGS. 5 through 7) which may be employed in some applications of the valve, such as the rocket engine injector application referred to earlier, for diffusing and mixing the two fluid streams emerging from the valve when the latter is open. As will appear presently, the three diffuser arrangements are effective to alter the fluid passage 20, the fluid passage 18, and both fluid passages, respectively.

Referring now in greater detail to the drawings, the shear valve 10 of the invention which has been selected for illustration in FIGS. 1 through 3 is intended for use as a bipropellant injection valve or injector for a bipropellant rocket engine, although it may conceivably be used for other purposes. The body member 12 of this valve includes an outer tubular section or manifold 36, closed at its rear end by an end wall 38, and an inner tubular section or manifold 40 which extends forwardly from the end wall and concentrically through the outer manifold. The front end of the outer manifold turns inwardly to form an annular end wall or flange 42 having a central opening 44. The adjacent or front end of the inner manifold 40 extends coaxially through this opening in radially spaced relation to the wall thereof. The outer and inner manifolds 36, 40 define therebetween an annular chamber 46.

Extending radially through the outer manifold 36 are a number of circumferentially spaced ports which together constitute the valve inlet 18–I. The valve inlet 20–I extends axially through the inner manifold 40 and opens through the left-hand end of this manifold. In the wall of the inner manifold are a number of circumferentially spaced ports 47 which communicate the inlet 20–I to the valve passage 20 which surrounds the inner manifold, as explained presently.

The obturator member 14 of the illustrated shear valve 10 is essentially a valve sleeve which is disposed within the valve body chamber 46, in surrounding relation to the inner manifold 40. At its rear end, that is, at its left-hand end of the drawing, the valve obturator or sleeve 14 is radially enlarged to form an annular piston 48. This piston slides within the rear end of the valve body chamber 46 which defines an annular cylinder 50 for the piston. The sealing means 34 comprise O-rings which are provided to seal the piston to the cylinder wall. Extending through the end wall 38 of the valve body 12 is a pressure port 54 communicating to the cylinder 50 behind the piston 48 and adapted for connection to a source of valve operating fluid under pressure. In the particular valve 10 under consideration, the piston 48, cylinder 50, and pressure port 54 together constitute the valve operating means 16. The illustrated valve operating means, therefore, is essentially a linear fluid pressure actuator which may be pressurized through the port 54 to drive the inner valve sleeve 14 to the right relative to the valve body 12.

Forwardly of its piston 48, the valve sleeve 14 is internally and externally stepped to various diameters, as shown. This stepped configuration of the valve sleeve provides the latter with a relatively radially thick annular land 56 contiguous the piston 48, an adjacent relatively thin annular web 58, a following radially enlarged annular land 60, and forward relatively thin annular web 62 having an internal annular lip 64 within its outer end.

In the particular shear valve illustrated, the valve body 12 and valve sleeve 14 define therebetween the two valve passages 18, 20. More specifically, the valve sleeve and the outer valve body manifold 36 define therebetween the passage 18. The valve sleeve and inner manifold 40 define therebetween the passage 20. When the valve is closed, the valve sleeve 14 occupies its rear closed position of FIG. 1 within the valve body.

In this position, the valve sleeve piston 48 is located adjacent the valve body end wall 38, and the valve sleeve web section 58 is located between and in radially spaced confronting relation to the valve body ports 18–I, 47. The valve sleeve lands 56, 60 are then located at axially opposed sides of the ports. The shear seals 22, 30 join these sleeve lands to the outer body manifold 36, and the shear seals 24, 32 join the lands to the inner body manifold 40. It will be understood, of course, that the shear seals extend about the full circumferences of the valve sleeve and valve body manifolds. Fluid flow through the valve passages 18, 20 and fluid leakage through the leakage paths 26, 28 is thus blocked with a positive sealing action when the valve is closed.

The illustrated shear seals 22, 24, 30, 32 are formed by welding the valve sleeve 14 of the valve body 12. More specifically, the two outer shear seals 22, 30 are formed by welding the outer surfaces of the valve sleeve lands 56, 60 to confronting internal annular lands 66, 68, respectively, on the outer valve body manifold 36. The two inner shear seals 32, 24 are formed by welding the inner surfaces of the valve sleeve lands 56, 60 to the outer surface of the inner body manifold 40 and an internal annular land 70 on the latter manifold, respectively. In order to permit assembly of the valve and welding of the various shear seals, the outer and inner valve body manifolds 36, 40 and valve sleeve 14 are constructed in several parts which are joined by welding, as shown in the drawing. Preferably, the shear seals are welded by an electron beam welding technique.

Formed in the edge wall of the openings 44 in the outer valve body manifold flange 42 are a number of circumferentially spaced radial slots 72. These slots define intervening standoff teeth 74. The inner surfaces of the standoff teeth slidably engage the outer surface of the valve sleeve web section 62 to slidably support the outer end of the valve sleeve 14. The slots 72 collectively constitute the valve outlet 18–O. The annular gap between the outer end of the inner manifold 40 and the lip 64 on the valve sleeve 14 constitutes the valve outlet 20–O. The primary purpose of the standoff teeth 74 is to positively maintain concentric the inner and outer manifolds 36, 40. Another important factor is the sizing or width of the radial slots 72 to provide the optimum orifice area for maintaining a controled fluid flow rate. The standoff teeth 74 also maintain a concentric annular orifice for the valve outlet 20–O.

The operation of the shear valve 10 is now believed to be obvious. Thus, when the valve is closed, the pressure fluids which are supplied to the valve inlets 18–I, 20–I are positively retained by the primary and secondary shear seals 22, 24, 30, 32. More specifically, the primary shear seals 22, 24 block fluid leakage from the valve inlets 18–I, 20–I to the valve outlets 10–O, 20–O through the main valve passages 18, 20. The secondary shear seals 30, 32 block fluid leakage from the valve inlets to the valve actuator cylinder 50. The valve is opened by admitting operating fluid to the cylinder 50, through the pressure port 54, under sufficient pressure to drive the valve sleeve 14 to the right in the drawings relative to the valve body 12 to its open position of FIG. 3. The shear seals 22, 24, 30, 32 are thereby sheared simultaneously and the valve inlets 18–I, 20–I are placed in direct communication with the valve outlets 18–O, 20–O through the main valve passages 18, 20 to permit fluid flow through the valve in the direction of the arrows in FIG. 3. Fluid leakage into the actuator cylinder behind the valve sleeve piston 48 is then blocked by the seal rings 34. Engagement of the valve sleeve piston 48 with the outer manifold land 66 limits the opening stroke of the sleeve. This stroke may be adjusted to obtain the optimum open position of the valve sleeve by machining the front face of the piston to vary the effective axial dimension of the valve sleeve land 56.

As noted earlier, the illustrated shear valve is intended for use as a bipropellant inpector for supplying two separate propellants to a bipropellant rocket engine. In this application, the valve is required to remain closed for an indefinite period of time in order to maintain the rocket engine in a constant state of firing readiness. Such an injection valve may be essentially a one shot valve which is opened once and never reclosed. Accordingly, the shear seals 22, 24, 30, 32 are then not required to effect any further sealing action after the valve is once opened. In other applications, however, it may be desirable to reclose the valve. In this event, valve closing means will be provided and the sheared surfaces of the sear seals are relied on to provide a sealing action in the reclosed position of the valve. In this regard, it will be appreciated that the shear seals may be welded in such a way that their sheared surfaces will provide an effective degree of sealing when the valve is reclosed following initial opening of the valve.

Figure 4:
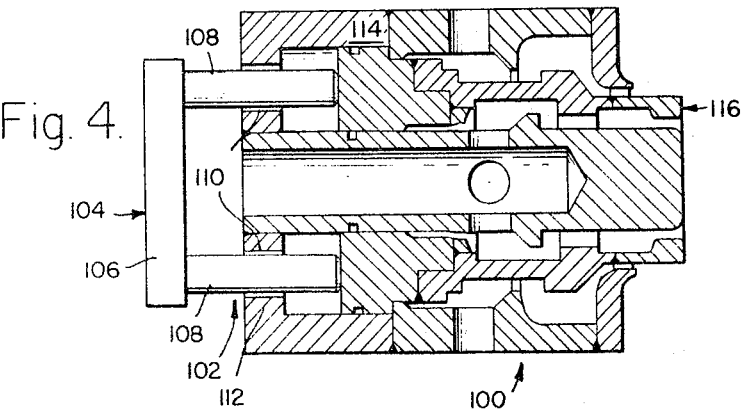
FIG. 4 is a longitudinal section through a slightly modified shear valve according to the invention.

FIG. 4 illustrates a modified shear valve 100 according to the invention having modified operating means 102. In this case, the operating means comprises an actuator including a yoke 104 having an external cross bar 106 secured to pins 108. Pins 106 extends through bores 110 in the rear wall 112 of the valve body 114 and seat against or are secured to the adjacent end of the valve sleeve 116. The modified valve is otherwise identical to the first described shear valve. It is obvious, therefore, that the modified valve operates in essentially the same way as the earlier shear valve except that the modified valve is opened by exterting a force on the exposed actuator yoke bar 106 by some external force applying means (not shown).

Figure 5:
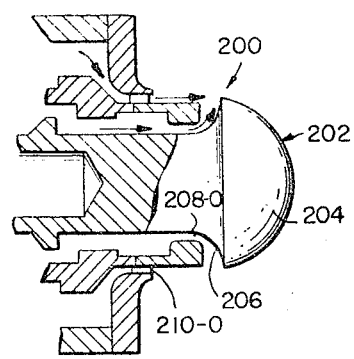
FIG. 5 is a fragmentary longitudinal section through diffuser means which may be employed in the valves of FIGS. 1 through 4 for diffusing and mixing the two fluids emerging from the valves when the latter are open.
Figure 6:
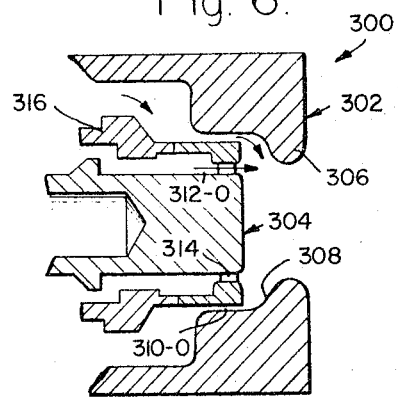
FIG. 6 is a fragmentary longitudinal section through modified diffuser means for the valves.
Figure 7:
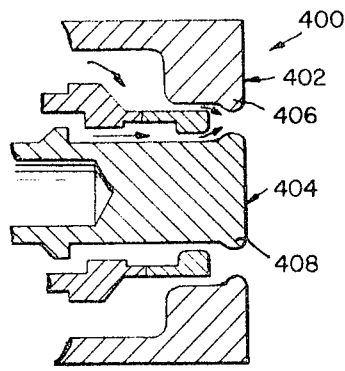
FIG. 7 is a fragmentary longitudinal section through further modified diffuser means for the valves.

In each of the described shear valves the fluids being controlled emerge through the valve outlets 18–O, 20–O in annular streams parallel to the valve axis. Depending upon the particular use to which the valve is to be applied, the emerging fluids may mix and enter a common receiver or conduit, or the emerging fluids may enter separate receivers or conduits. As already noted, the illustrated valve may serve as an injector for a bipropellant rocket engine. In this case, the valve is mounted on the rocket engine combustion chamber in such a way that the two propellants mix as they emerge from the valve and enter the combustion chamber for burning therein. Suitable diffuser means must then be provided for properly diffusing and mixing the emerging propellants. FIGS. 5 through 7 illustrate three possible diffuser means for this purpose.

The diffuser 200 illustrated in FIG. 5 is a pintle diffuser in which the outer end of the inner valve manifold 202 is provided with an enlarged deflector head 204. The inwardly facing surface 206 of this head is curved to deflect the annular propellant stream emerging through the inner valve outlet 208–O outwardly into the path of the annular propellant stream emerging axially through the outer valve outlet 210–O.

The modified diffuser 300 illustrated in FIG. 6 is a peripheral diffuser in which the outer end of the outer valve manifold 302 extends axially beyond the inner manifold 304 and projects radially in toward the valve axis to provide an annular deflector lip 306. The inwardly facing surface 308 of this lip is curved to deflect the propellant stream emerging through the outer valve outlet 310–O into the path of the propellant stream emerging axially through the inner valve outlet 312–O. In this case, the standoff teeth 314 for the valve sleeve 316 may be formed on the inner valve manifold 304, as shown.

FIG. 7 illustrates a combined pintle-peripheral diffuser 400 in which the outer and inner valve manifolds 402, 404 are provided with a deflector lip 406 and a deflector head 408, respectively, for deflecting both emerging propellant streams toward one another. The combined or mixed propellant stream then emerges axially through the annular flow space between the lip 406 and head 408.

It is obvious that the diffuser means illustrated in FIGS. 5 through 7 may be embodied in either of the shear valve constructions illustrated in FIGS. 1 through 4. In this regard, it will be understood that the shear valves illustrated in fragmentary fashion in FIGS. 5 through 7 are identical, except for the diffuser means, to an earlier shear valve. The illustrated diffuser means, of course, may be utilized on other bipropellant injection valve constructions than the particular shear valves illustrated.

The embodiments of the invention in which an exclusive property or privilege is claimed are defined as follows:

1. A shear valve comprising:
   a body member;
   an obturator member within said body members;
   said members being relatively movable along a given direction line between valve closed and valve open positions and defining first and second fluid passages which are isolated from one another and have inlet and outlet ends respectively;
   first shear seal means joining said members in their closed positions and extending across said first passage transversely of said direction line between the inlet and outlet ends of said first passage for blocking fluid flow through said first passage;
   second shear seal means joining said members in their closed positions and extending across said second passage transversely of said direction line between the inlet and outlet ends of said second passage for blocking fluid flow through said second passage; and
   operating means for exerting on said members opposing forces of sufficient magnitude to shear said seals and move said members relative to one another to open positions, thereby to permit fluid flow through said passages.

2. A shear valve according to claim 1, wherein:
   said operating means are located at the high pressure side of said shear seal means;
   said members define a first leakage path between said first passage and said operating means and a second leakage path between said second passage and said operating means;
   said valve includes secondary shear seal means joining said members in their closed positions and extending across said first leakage path transversely of said direction line for blocking leakage through said first path, and additional secondary shear seal means joining said members in their closed positions and extending across said second leakage path transversely of said direction line for blocking leakage through said second path; and
   said operating means being effective to exert opposing forces on said members of sufficient magnitude to shear all of said shear seals.

3. A shear valve according to claim 1, wherein:
   said operating means comprise a fluid pressure chamber between said members at the high pressure side of said shear seal means bounded by pressure walls on said members, respectively, disposed in planes transversed to said direction line, and means for admitting valve operating fluid under pressure to said chamber;
   said members define a first leakage path between said first passage and said chamber and a second leakage path between said second passage and said chamber;
   said valve includes secondary shear seal means joining said members in their closed positions and extending across said first leakage path transversely of said direction line for blocking leakage through said first path, and additional secondary shear seal means joining said members in their closed positions and extending across said second leakage path transversely of said direction line for blocking leakage through said second path; and
   said chamber being adapted to receive valve operating fluid under sufficient pressure to effect shearing of all of said shear seals.

4. A shear valve according to claim 1, wherein:
   said operating means comprise a movable valve actuator engaging said obturator member at the high pressure side of said shear seal means and accessibly externally of said body member through an opening in said body member;
   said members define a first leakage path between said first passage and said opening and a second leakage path between said second passage and said opening;
   said valve includes secondary shear seal means joining said members in their closed positions and extending across said first leakage path transversely of said direction line for blocking leakage through said first path, and additional secondary shear seal means joining said members in their closed positions and extending across said second leakage path transversely of said direction line for blocking leakage through said second path; and
   said body member and actuator being adapted to receive opposing forces of sufficient magnitude to shear all of said shear seals.

5. A shear valve according to claim 1, wherein:
   said shear seals comprise welded joints between said members.

6. A shear valve comprising:
   a body including concentric inner and outer generally tubular sections;
   a valve sleeve concentrically disposed between said sections;
   said body and sleeve being relatively axially movable between valve open and valve closed positions;
   said outer body section and sleeve defining therebetween an outer annular fluid passage having inlet and outlet ends;
   said inner body section and sleeve defining therebetween an inner annular fluid passage having inlet and outlet ends;
   an outer annular shear seal joining said outer body section and sleeve in their closed positions and extending radially across said outer passage between said inlet and outlet ends thereof for blocking flow through said outer passage;
   an inner annular shear seal joining said inner body section and sleeve in their closed positions and exteding radially across said inner passage between said inlet and outlets thereof for blocking flow through said inner passage; and
   operating means for exerting on said body and sleeve opposing axial forces of sufficient magnitude to shear said seals and move said body and sleeve relative to one another to open positions, thereby to permit flow through said passages.

7. A shear valve according to claim 6, wherein:
   said operating means are located at the high pressure side of said shear seal means;
   said outer body section and sleeve define therebetween an outer annular leakage path between said outer passage and said operating means, and said inner body section and sleeve define therebetween an inner annular leakage path between said inner passage and said operating means;

said valve includes an outer annular secondary shear seal joining said outer body section and sleeve in their closed positions and extending radially across said outer leakage path for blocking leakage through said outer path, and an additional annular inner secondary shear seal joining said inner body section and sleeve in their closed positions and extending radially across said inner leakage path for blocking leakage through said inner path; and said operating means being effective to exert opposing forces between said body member and sleeve of sufficient magnitude to shear all of said seals.

8. A shear valve according to claim 6, wherein:

said operating means comprise a fluid pressure chamber between the end of said sleeve at the high pressure side of said shear seals and the adjacent end of said body bounded by pressure walls on said sleeve and body, respectively, disposed in planes transverse to the axis of said sleeve;

said outer body section and sleeve define therebetween an outer annular leakage path between said outer passage and said chamber, and said inner body section and sleeve define therebetween and inner annular leakage path said inner passage and said chamber;

said valve includes an outer annular secondary shear seal joining said outer body section and sleeve in their closed positions and extending radially across said outer leakage path for blocking leakage through said outer path, and an additional inner annular secondary shear seal joining said inner body section and sleeve in their closed positions and extending radially across said inner leakage path for blocking leakage through said inner path; and said chamber being adapted to receive a valve operating fluid under sufficient pressure to shear all of said seals.

9. A shear valve according to claim 6, wherein:

said operating means comprise an actuator extending axially of and engaging the end of said sleeve at the high pressure side of said shear seals and extending externally of said body through an opening in the adjacent end of said body;

said outer body section and sleeve define therebetween an annular leakage path between said outer passage and said opening, and said inner body section and sleeve define therebetween an annular leakage path between said inner passage and said opening;

said valve includes an outer annular secondary shear seal joining said outer body section and sleeve in their closed positions and extending radially across said outer leakage path for blocking leakage through said outer path, and an additional inner annular secondary shear joining said inner body section and sleeve in their closed positions and extending radially across said inner leakage path for blocking leakage through said inner path; and said body and actuator being adapted to receive opposing forces of sufficient magnitude to shear all of said seals.

10. A shear valve comprising:

a body including an end wall and concentric inner and outer generally tubular sections joined to and extending from one side of said wall;

a valve sleeve concentrically disposed between said inner and outer sections;

said sleeve being movable relative to said body between a close position adjacent said end wall and an open position remote from said end wall;

said sleeve and outer section defining therebetween an annular outer fluid passage having an annular outlet opening axially through the end of said body remote from said end wall;

said sleeve and inner section defining therebetween an annular inner fluid passage having an annular outlet opening axially through the end of said body remote from said end wall;

said outer section containing an inlet opening radially to said outer passage between the ends of said body, and said inner section containing an axial inlet at one end through said end wall and at the outer end radially to said inner passage between the ends of said body;

operating means at the end of said sleeve adjacent said end wall for exerting opposing forces on said body and sleeve to move said sleeve from said closed position to said open position;

said sleeve and outer member defining therebetween an outer annular leakage path between said operating means and outer passage;

said sleeve and inner member defining therebetween an inner annular leakage path between said operating means and said inner passage;

an outer annular primary shear seal joining said outer section and sleeve in the closed position of said sleeve and extending radially across said outer passage between said inlet and outlet thereof for blocking flow through said outer passage;

an inner annular primary shear seal joining said inner section and sleeve in the closed position of said sleeve and extending radially across said inner passage between said inlet and outlet thereof for blocking flow through said inner passage;

an outer annular secondary shear seal joining said outer section and sleeve in the closed section of said sleeve and extending radially across said outer leakage path between said outer passage and said operating means for blocking leakage through said outer path; and an inner annular secondary shear seal joining said inner section and sleeve in the closed position of said sleeve and extending radially across said inner leakage path between said inner passage and said operating means for blocking leakage through said inner path.

11. A shear valve according to claim 10, wherein:

said valve is a bi-fluid mixing valve; and said valve includes diffuser means adjacent said outlets for deflecting the annular fluid stream emerging through one outlet laterally into the path of the annular fluid stream emerging through the other outlet.

12. A shear valve according to claim 11, wherein:

said diffuser means include means for deflecting both fluid streams laterally toward one another.

13. A shear valve comprising:

a body member;

an obturator member within said body member;

said members being relatively movable along a given direction line between valve closed and valve open positions and defining a fluid passage having inlet and outlet ends;

a primary shear seal joining said members in their closed positions and extending across said passage transversely of said direction line between the inlet and outlet ends of said passage for blocking fluid flow through said passage;

operating means at the high pressure side of said shear seal for exerting on said members opposing forces of sufficient magnitude to shear said seal and move said members relative to one another to open position, thereby to permit fluid flow through said passage;

said members defining therebetween a leakage path between said passage and operating means; and a secondary shear seal joining said members in their closed positions and extending across said leakage path transversely of said direction line between said passage and said operating means for blocking fluid leakage through said leakage path, said secondary shear seal being sheared simultaneously with said primary seal upon operation of said operating means to move said members to open position.

(References on following page)

References Cited

UNITED STATES PATENTS

| | | | |
|---|---|---|---|
| 2,551,114 | 5/1951 | Goddard | 239—424 |
| 2,730,433 | 1/1956 | Cartledge | 239—424 |
| 2,766,832 | 10/1956 | Mathison | 169—28 |
| 2,947,315 | 8/1960 | Connell | 137—68 |
| 2,997,051 | 8/1961 | Williams | 137—68 |
| 3,024,045 | 3/1962 | Cleminshaw et al. | 239—424 |
| 3,027,903 | 4/1962 | Thorp | 137—68 |
| 3,059,613 | 10/1962 | Nakaga | 239—424 |
| 3,111,133 | 11/1963 | Fulton et al. | 137—68 |
| 3,111,266 | 11/1963 | Axelson et al. | 239—424 |
| 3,141,470 | 7/1964 | La Fontaine | 137—68 |

EVERETT W. KIRBY, Primary Examiner

U.S. Cl. X.R.

137—68; 169—28; 239—424